United States Patent
Gordon et al.

(10) Patent No.: US 9,646,180 B2
(45) Date of Patent: May 9, 2017

(54) DEVICE MONITORING USING MULTIPLE SERVERS OPTIMIZED FOR DIFFERENT TYPES OF COMMUNICATIONS

(71) Applicant: Absolute Software Corporation, Vancouver (CA)

(72) Inventors: William Doyle Gordon, Vancouver (CA); Arkadi Tchoudnovskii, Richmond (CA)

(73) Assignee: Absolute Software Corporation, Vancouver, BC (CA)

( * ) Notice: Subject to any disclaimer, the term of this patent is extended or adjusted under 35 U.S.C. 154(b) by 0 days.

(21) Appl. No.: 14/438,226

(22) PCT Filed: Oct. 28, 2013

(86) PCT No.: PCT/CA2013/000923
§ 371 (c)(1),
(2) Date: Apr. 23, 2015

(87) PCT Pub. No.: WO2014/063240
PCT Pub. Date: May 1, 2014

(65) Prior Publication Data
US 2015/0294124 A1    Oct. 15, 2015

Related U.S. Application Data

(60) Provisional application No. 61/719,259, filed on Oct. 26, 2012.

(51) Int. Cl.
*G06F 21/00*        (2013.01)
*G06F 21/88*        (2013.01)
(Continued)

(52) U.S. Cl.
CPC .............. *G06F 21/88* (2013.01); *H04L 67/10* (2013.01); *H04L 67/125* (2013.01);
(Continued)

(58) Field of Classification Search
CPC ........................................................ G06F 21/00
See application file for complete search history.

(56) References Cited

U.S. PATENT DOCUMENTS

2002/0091599 A1*  7/2002  Masuda ................. H04L 67/36
                                                                                705/30
2003/0188028 A1* 10/2003  Kawamura ........... H04W 28/06
                                                                                709/249

(Continued)

*Primary Examiner* — Josnel Jeudy
(74) *Attorney, Agent, or Firm* — Brokaw Patent Law PC; Christopher J. Brokaw

(57) ABSTRACT

An electronic device monitoring system uses two different types of servers to communicate with electronic devices of users. One type of server, which may be a rapid contact server, is optimized or configured for relatively short and frequent communications with the electronic devices. The other type of server is optimized or configured for less frequent but (typically) longer communications with the electronic devices. In some embodiments, the electronic devices are configured to communicate relatively frequently (e.g., every few minutes) with the rapid contact server. When an electronic device is reported as lost or stolen, the rapid contact server may instruct the electronic device to contact the other type of server to obtain security-related instructions.

31 Claims, 12 Drawing Sheets

(51) Int. Cl.
  *H04W 12/12*  (2009.01)
  *H04L 29/08*  (2006.01)
  *H04L 29/06*  (2006.01)
  *H04W 4/20*   (2009.01)
  *H04W 4/00*   (2009.01)

(52) U.S. Cl.
  CPC ............ *H04L 67/141* (2013.01); *H04L 69/18* (2013.01); *H04W 12/12* (2013.01); *H04W 4/001* (2013.01); *H04W 4/20* (2013.01)

(56) References Cited

U.S. PATENT DOCUMENTS

| | | | | |
|---|---|---|---|---|
| 2005/0138194 A1* | 6/2005 | Lu | ............................ | H04L 29/06 709/230 |
| 2006/0046686 A1* | 3/2006 | Hawkins | ............. | G06F 17/3089 455/403 |
| 2009/0287895 A1* | 11/2009 | Foley | .................. | G06F 12/1433 711/163 |
| 2012/0171998 A1* | 7/2012 | Kang | ...................... | G06F 21/88 455/411 |
| 2013/0335223 A1* | 12/2013 | Brown | .................. | G08B 13/14 340/568.1 |

* cited by examiner

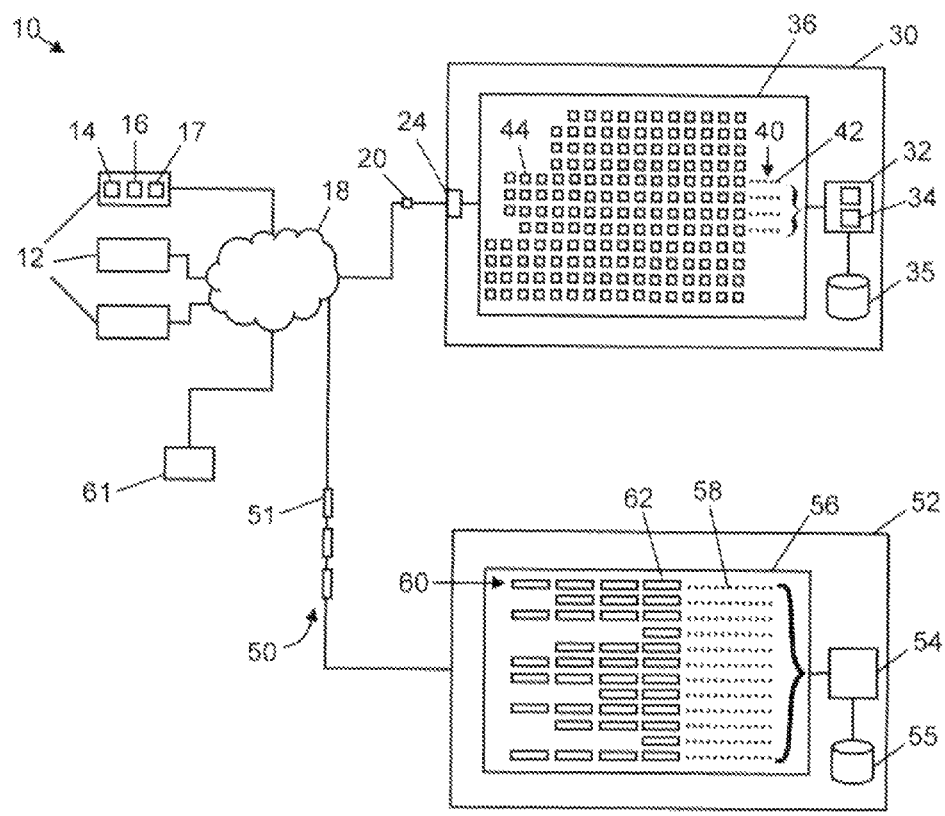
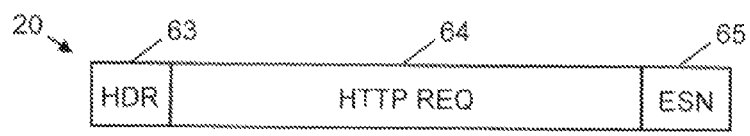
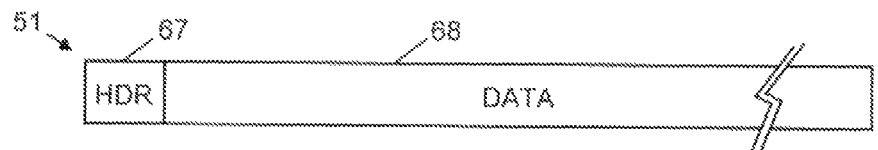
FIG. 1
FIG. 2
FIG. 3

DEVICE MONITORING USING MULTIPLE SERVERS OPTIMIZED FOR DIFFERENT TYPES OF COMMUNICATIONS

CROSS-REFERENCE TO RELATED APPLICATIONS; BENEFIT CLAIM

This U.S. National Stage Patent Application under 35 U.S.C. §371 claims the benefit of International Patent Application No. PCT/CA2013/000923 filed Oct. 28, 2013, which claims priority to U.S. Provisional Patent Application No. 61/719,259 filed on Oct. 26, 2012, the entire contents all of which are hereby incorporated by reference as if fully set forth herein.

TECHNICAL FIELD

The present disclosure relates to the protection of electronic devices from loss or theft, and in particular to systems and methods for monitoring such devices and being able to contact them frequently and on short notice.

BACKGROUND

Personal electronic computing or communications devices are often lost or stolen. Since proprietary information is routinely stored on such devices, the need to protect such proprietary or sensitive data and to recover such devices is self-evident.

Laptops, and increasingly other electronic devices such as cell phones, PDAs, smart phones (e.g. Blackberry™, iPhone™), memory sticks, personal media devices (e.g. iPod™), gaming devices, tablet computers, electronic books and personal computers, are often remotely tracked so that they can be recovered in the event of theft. Such tracking may be effected by sending location information to a remote storage site, an email server or a personal mobile electronic device.

During communications with a tracked device, commands may be sent for data deletion, encryption, encryption key deletion, updating software, retrieving data, retrieving screen shots, retrieving camera shots, etc.

Tracking traditionally occurs intermittently, to avoid excessive bandwidth usage and to minimize the risk of being noticed by a thief. When a device is stolen between two such tracking communications, the owner or user of the device has to wait until the following tracking communication in order to trigger a security action, such as data delete, on the device.

SUMMARY

An electronic device monitoring system uses two different types of servers to communicate with electronic devices of users. One type of server, which may be a rapid contact server, is optimized or configured for relatively short and frequent communications with the electronic devices. The other type of server is optimized or configured for less frequent but (typically) longer communications with the electronic devices. In some embodiments, the electronic devices are configured to communicate relatively frequently (e.g., every few minutes) with the rapid contact server. When an electronic device is reported as lost or stolen, the rapid contact server may instruct the electronic device to contact the other type of server to obtain security-related instructions. By optimizing the two servers differently, an electronic device may be said to be configured to communicate with each according to different protocols, where each protocol is optimized to the specific server.

This summary is not an extensive overview intended to delineate the scope of the subject matter that is described and claimed herein. The summary presents aspects of the subject matter in a simplified form to provide a basic understanding thereof, as a prelude to the detailed description that is presented below. Neither this summary, the drawings nor the following detailed description purport to define or limit the invention; the invention is defined only by the claims.

BRIEF DESCRIPTION OF THE DRAWINGS

For a fuller understanding of the nature and advantages of the disclosed subject matter, as well as the preferred mode of use thereof, reference should be made to the following detailed description, read in conjunction with the accompanying drawings. In the drawings, like reference numerals designate like or similar steps or parts.

FIG. 1 is a basic block diagram of a rapid contact system in accordance with embodiments of the disclosed subject matter.

FIG. 2 is a schematic diagram of a rapid contact packet sent by a device to a rapid contact server.

FIG. 3 is a schematic diagram of a regular packet transmitted between a device and a main server.

DETAILED DESCRIPTION OF SPECIFIC EMBODIMENTS

A. Terminology

Figures 4, 5:
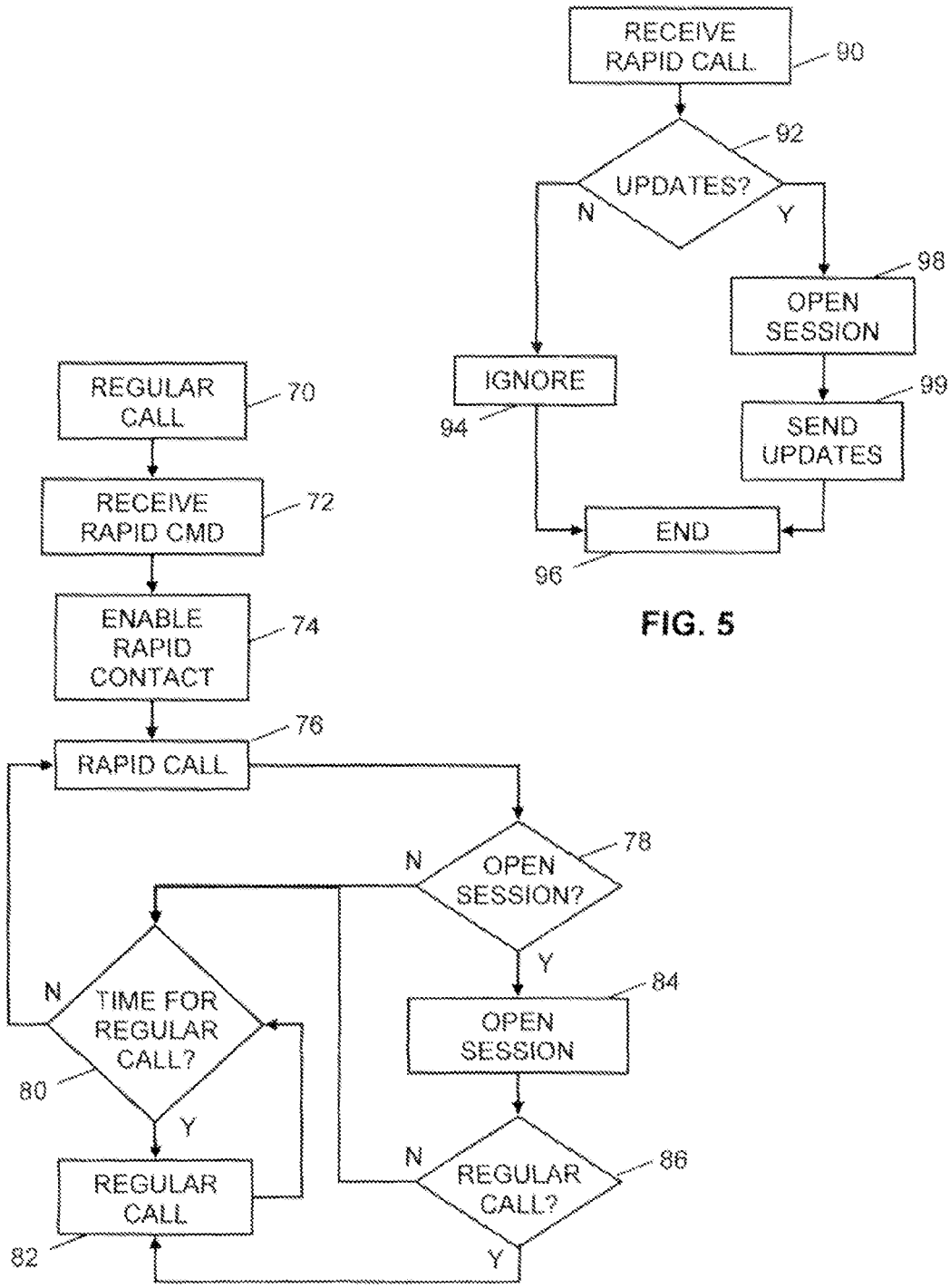
FIG. 4 is a flowchart of a process performed by a device in a rapid contact system in accordance with embodiments of the disclosed subject matter.
FIG. 5 is a flowchart of a process performed by a rapid contact server.

Agent. As used herein, an agent is a software, hardware or firmware agent that is ideally persistent and stealthy. Typically, the agent includes or consists of executable instructions that reside in processor readable memory in a computer or other electronic device. The agent typically provides servicing functions which require communication with a remote server. Preferably, the agent is tamper resistant and can be enabled for supporting and/or providing various services such as data delete, firewall protection, data encryption, location tracking, message notification, software deployment and updates.

An illustrative embodiment of an agent is found in the commercially available product Computrace Agent™. The technology underlying the Computrace Agent™ has been disclosed and patented in the U.S. and other countries, which patents have been commonly assigned to Absolute Software Corporation. See, for example, U.S. Pat. Nos. 5,715,174; 5,764,892; 5,802,280; 6,244,758; 6,269,392; 6,300,863; 6,507,914; 7,818,803; 7,945,709 and related foreign patents. Details of the persistent function of an agent are disclosed in U.S. Patent Application Publications Nos. US2005/0216757 and US2006/0272020. The technical disclosures of these documents are fully incorporated by reference as if fully set forth herein. It is feasible to use an equivalent agent to the Computrace Agent™, or less preferably an alternative agent with less functionality could be used. For the purposes of the present disclosure, the minimum functional attribute of the agent is to facilitate communications between the electronic device and a monitoring center or other remote computer or server. Communications are generally initiated by the agent.

Device. This is an electronic device to be protected. Examples of a device include a laptop, cell phone, personal digital assistant, smart phone, memory stick, personal media device, gaming device, personal computer, tablet computer, electronic book and netbook. The agent resides in the device, which may also be referred to as a host for the agent. A device may also be referred to as a client.

Electronic Serial Number (ESN). A unique number that identifies a device or an agent within the device. An ESN may be stored in memory and/or in a register in the device.

Token, Public Token or Authentication Token. This is an encrypted ESN, and it may be protected by a hash.

Rapid Contact Server (RCS). A computer or computer system that a large number of remote devices contact frequently and briefly to receive awaiting commands, if any, without significant delay. An RCS may be part of a monitoring center, and may be known as a Fast Contact server or FC server. Typically, the RCS has a small pool of processing threads, none of which are dedicated to a communication session.

Main Server. A guardian server or other computer or computer system that remote devices communicate less frequently and longer with (compared to an RCS) in order to receive awaiting commands, if any. For example, provided an internet connection is available to the device, an agent may call the main server once a day (or at some other selected suitable interval) to report the location of the device, download software upgrades if there are any, and repair any security modules that are or should be installed on the device. The interval between calls may be modified (e.g. reduced) if a device moves into a high risk area from a low risk area, or if the device is lost or stolen. Communication to the main server may be, for example, via the internet (wired or wireless), via a wired or wireless telephone network, via cable or via satellite. The main server may receive notifications from owners of electronic devices that they have been lost or stolen, and as a result, the main server may transmit a message to the lost or stolen electronic device that initiates some kind of security action. The action may be to lock the device, to sound an alarm, to delete data and/or to provide location information, for example. The action may be to provide a list of files on the device, retrieve files from the device, invoke processor based anti-theft features, encrypt data on the device, or delete an encryption key, etc. In general, the protected devices initiate calls to the main server.

Monitoring Center. This is a system which, in a preferred embodiment, includes an RCS and a main server. It may include an email server or it may be a group or distribution of servers or other computers. In the embodiments disclosed herein, the agent sends device identification and location information to remote electronic storage located in, or accessible by, the monitoring center, and/or any other data desired to be transferred. The functions of a monitoring center may be incorporated into or associated with an electronic social network server. The monitoring center may receive notifications from owners of electronic devices that they have been lost or stolen. In general the protected devices initiate calls to the monitoring center, but the monitoring center may also be configured to initiate calls to the protected devices, for example via SMS, if the devices are so equipped.

Rapid Call. A communication between a device and the RCS, which may be a one-way communication from the device to the RCS. A rapid call may or may not result in a response from the RCS. It may result in a rapid contact session, which is a short session between the device and the RCS. A rapid call may also be referred to as a Fast Call, or FC.

Rapid Contact Session, or Short Session. This is a short communication session that is established between a device and a rapid contact server and is typically only a few packets long, such as up to, or having a maximum of, four or five packets.

Regular Call. A communication between a device and the main server, during which generally larger amounts of information are exchanged.

Scheduled Regular Call. A regular call that occurs at a scheduled time.

Immediate Regular Call, or Forced Call. A regular call that is requested during a communication with the RCS and occurs at a time other than the time for a scheduled regular call.

The following detailed descriptions are presented largely in terms of methods or processes, symbolic representations of operations, functionalities and features of the invention. These method descriptions and representations are the means used by those skilled in the art to most effectively convey the substance of their work to others skilled in the art. A software implemented method or process is here, and generally, conceived to be a self-consistent sequence of steps leading to a desired result. These steps involve physical manipulations of physical quantities. Often, but not necessarily, these quantities take the form of electrical or magnetic signals capable of being stored, transferred, combined, compared, and otherwise manipulated. It will be further appreciated that the line between hardware, software and firmware is not always sharp, it being understood by those skilled in the art that software implemented processes may be embodied in hardware, firmware, or software, in the form of coded instructions such as in microcode and/or in stored programming instructions. In general, unless otherwise indicated, singular elements may be in the plural and vice versa with no loss of generality. The use of the masculine can refer to masculine, feminine or both. Drawings are not to scale.

In many parts of the detailed description, the subject matter has been explained in relation to stolen devices, but it would of course be evident to those of skill in the art that it applies equally as well to devices that are lost.

B. Exemplary Embodiment

A symbolic block diagram of a preferred embodiment of the rapid contact system 10 is shown in FIG. 1. The system 10 is intended to protect electronic devices such as devices 12 by providing an efficient means for promptly contacting them and controlling them remotely. In practice, there may be up to several million or more such devices 12 in the system. The devices 12 are connected by a network 18 to an RCS 30 and a main server 52. The network 18 may be the Internet, or include the Internet, or it may be, or include, a telecommunications network. Connections between the devices 12 and the network 18 may be wired or wireless, and the devices may be connected continually or intermittently to the network.

An agent 14 in each electronic device 12 causes the devices to call in regularly, or approximately so, to the RCS 30. The RCS 30 comprises a processor 32, which may contain one or more processing cores 34, connected to a database 35, and memory 36, and configured to process computer readable instructions in a fixed, relatively small pool 40 of threads 42. In this example there are twice the number of threads as there are processor cores. In a system with a 24-core processor, for example, there may be 48 threads in the thread pool 40. In other embodiments, other ratios are possible. Calls may be made about every 30 minutes, for example, or on any other appropriate time cycle. A call in some embodiments consists of the sending of a single, small packet 20 containing the device's electronic serial number (ESN) 16 to input/output completion port 24 of the RCS 30. The ESN 16 may be included in the small packet 20 in an encrypted form, such as in token 17. The single packets of data sent to the RCS 30 each contain typically a total of 10-100 bytes. The small packet 20 becomes a task 44 that is to be processed by each thread 42.

When a task 44 is processed by the RCS 30 in a thread 42, any remaining headers and checksums etc. are stripped from the small packet 20 and the HTTP command is interpreted by the processor 32 to reveal the ESN 16 of the device 12 that sent the packet, which may involve decrypting the token 17 if the ESN 16 was sent encrypted in it. The processor 32 then takes an action, or not, depending on the ESN 16 that has been revealed. The ESNs and corresponding awaiting actions may be stored in the database 35. Such an action, for example, may be to request the setting up of a session, in which case it will be a short session. In such a rapid contact session, in which about 700 bytes or less of data may be exchanged, the RCS 30 may send an instruction to the device 12 to call the main server 52, which is set up for relatively lengthy communications with the devices. The agent may use different respective communication protocols to communicate with the RCS 30 versus the main server 52. For example, the protocol used for RCS communications may be optimized (e.g., through reduced handshaking and smaller message sizes) for relatively short, frequent communications relative to the protocol used for communication with the main server.

For example, a device 12 may be flagged in the system 10 as being stolen. The owner of the device 12 may do this using computer 61 or another electronic device to access the main server 52 to input the status of the device 12 as stolen. Such a device status is stored in a database 55 in, or accessible by, the main server 52 and in the database 35 accessible by the RCS 30. In this case the device, when calling the RCS 30, will be instructed to call the main server 52, which will then instruct the device to provide its location to the main server, to call the main server more frequently, or to enter a frozen state. As another example, a rapid contact session may be used to send updated parameters from the RCS 30 to the device 12, such as an updated rapid call interval. Alternately, the device 12 may be flagged in the system 10 to be sent a message, which may be sent during a call with the main server 52. If the device 12 has not been flagged as stolen, and not flagged for anything else that would require a regular call, the RCS 30 may not send any response to the device, as it would be unnecessary and would waste network bandwidth. However, the system 10 may alternately be configured for the RCS 30 to send an HTTP Status 200 (i.e. message received OK) response to the device, or other suitable acknowledgment. Still alternately, if there is no action awaiting for the device 12, the RCS 30 may send a disconnect message back to the device, or simply disconnect.

Rapid contact sessions between the device 12 and the RCS 30 may also be used for setting a new authorization token, where the device or agent 14 in the device does not already have one, has an invalid one, or should have one replaced due to the contents of a security policy. The rapid contact session may also be used for setting the time for the next scheduled regular call to the main server 52. The rapid contact session may be used for redirecting regular agent calls to a different main server, such as a main server for specifically managing data delete operations, or a main server for managing encryption. If the device 12 has been stolen, the rapid contact session may redirect the agent to call a different main server that deals specifically with stolen devices. The rapid contact sessions may also be used for changing the time interval between rapid calls, or for redirecting the rapid calls to another RCS. The rapid contact sessions may also be used for reporting the contents of fields in the agent 14 or the device 12. In some cases, up to about 4 KB of data may be transferred. Other processes may also be implemented during a rapid contact session, the main requirement being that the session is short enough not to require dedicated processing threads, and short enough not to significantly disturb the efficient functioning of the RCS 30 in relation to the other devices 12 that make rapid calls to it. Most of the time the devices 12 make calls to the RCS 30 that are not answered, or for which no action is required.

The electronic devices 12 may call the main server 52 upon being commanded to do so by the RCS 30. The devices 12 may also call the main server 52 regularly, approximately regularly, semi-periodically, semi-randomly or as a result of detecting a trigger, or according to any programmable scheme desired. The main server 52 comprises a processor 54, connected to the database 55 and memory 56, and may be configured to process computer readable instructions in a relatively large number of threads 58. The threads 58 preferably do not form part of a pool. In contrast to the RCS 30, there is preferably at least one thread 58 dedicated to each session 60. Calls may be made about every 24.5 hours, for example, or on any other appropriate time cycle. Communications 50 from the devices 12 to the main server 52 are typically at least 10-10,000 times (i.e. 1-4 orders of magnitude) longer than communications to the RCS 30. Such a communication session contains typically between 10-500 packets 51, each up to 1500 bytes long. The tasks 62 in each session 60 processed by corresponding thread 58 are typically large in comparison to the tasks 44 processed in the RCS 30. In a typical system, as many as 8000 or more sessions may be maintained concurrently in the main server 52, each with at least one dedicated thread. The number of sessions is limited by the amount of RAM, or memory 56.

The database 55 stores tasks, updates and commands, etc. to be communicated to each device 12. Whenever an owner or administrator of a device 12 needs to change the record of the device's status, force an immediate regular call, or obtain current parameters of the device, etc., these can all be done using computer 61 or other appropriate device connected to the network 18. If data should be deleted from a device 12, or the device should be frozen, these commands too can be communicated to the main server 52 via computer 61. Devices may be grouped and rapid calling may collectively be requested to be enabled or disabled by an administrator of such a group of devices, via computer 61, for example. The main server 52 can transmit information about the rapid calling status of the device 12 in question to computer 61. Such information may be whether the device 12 is currently enabled for rapid calling, whether the device is currently calling or is offline, and the time of the last rapid call. The main server 52 communicates with the RCS 30 from time to time so that the database 35 in the RCS can be updated with actions for the device during its subsequent rapid call. For example, the RCS's database 35 can be updated to cause the RCS to instruct the device 12 to call the main server 52; the device may respond to such an instruction by calling the main server immediately, or at some other point prior to its next regularly-scheduled call to the main server.

A single communication between a device 12 and the main server 52 may result in multiple tasks being created that can be run in parallel running threads. For example, two, three or more dedicated threads 58 may be used as a result of a single communication 50 with the main server 52.

The main server 52 is responsible for the main communications with the devices 12 which may include messages from the server to command the device to provide its location to the server, to delete data, to send identification of some or all of its components, or to take any kind of security action. The main server 52 may also transmit upgrades to the devices 12. Since the main server 52 accepts relatively long communications and performs relatively lengthy tasks, in which the session 60 is kept alive and its context or state maintained, one or more dedicated threads are used for each communication session. In contrast to this, the RCS 30 keeps no or very minimal track of state, and so non-dedicated threads can be used in the RCS. This is also the case, both for the rapid calls and for the rapid contact sessions which may be requested by the RCS 30, and subsequent packets sent by the devices 12 to the RCS in such a rapid contact session may be processed by any of the threads 42.

In order for the rapid contact session to have predetermined states, reading and writing a whole array of 516 bytes, for example, should be supported, with all the necessary modifications carried out within the RCS 30. The agent 14 may allow such changing of settings during secured rapid contact sessions, or the RtlCopyMemory Windows™ API (application programming interface) can be used in order to write settings into memory and then copy them to the settings address. The former approach is faster as it requires just one transaction. In the latter approach, the agent should detect the address of the RtlCopyMemory routine before the rapid contact session starts.

The rapid calls from the devices 12 to the RCS 30 and rapid contact sessions between the two are much briefer than regular calls to the main server 52, and may be several orders of magnitude shorter. The purpose of these rapid calls is to let the RCS 30 know of the online availability of the devices and provide the rapid contact system 10 with a means to promptly establish a regular call between the devices 12 and the main server 52, if needed. For example, a stolen electronic device may be flagged as such in the rapid contact system 10, and more specifically in the RCS 30 and main server 52. When a device 12 that is stolen calls in to the RCS 30, it will be instructed by the RCS to immediately call the main server 52 for more extensive instructions, which may include a data deletion command, a lock command, etc. This avoids clogging up the RCS 30 with lengthy tasks, while eliminating the waiting period the device would normally be subjected to if it were to wait until its next scheduled time to call the main server 52. The relatively low number of threads 42 in thread pool 40 is appropriate for dealing with a relatively large number of small tasks 44 from a large number of devices 12, for communications for which state does not need to be maintained, or for which there are so few predictable values of state that it can be tracked without needing threads that are dedicated to a session.

A thread pool 40 is used in the RCS 30 because thread creation is not particularly cheap in terms of processor usage, and having a pool of ready-waiting threads makes the allocation and processing of incoming tasks 44 more efficient, especially if the number of threads is optimized. In order to maximize the efficiency of the processor 32 in the RCS 30, the code for processing the small packets 20 should ideally be kept to a minimum, and should be separate from the code in the main server 52 that is used for processing the regular communications. This allows the RCS 30 to process as many simultaneous calls as possible, depending on operating system resources and network throughput.

The communications between the devices 12 and the RCS 30 utilize a completion port 24, which allows threads to wake up for processing of any I/O operation. Every session context is kept in a thread-safe dictionary and becomes active as soon as the corresponding I/O operation completes. The session context maintains the current session state, which allows the RCS 30 to continue with a current session. During the processing of a current session, all blocking operations, including communications to the database 55, should be avoided or offloaded to other, specific threads or thread pools in the RCS 30 in order to ensure that thread 40 used for the rapid contact session becomes available for another completed I/O operation as soon as possible.

The RCS 30 may support both keep-alive and non-keep-alive sessions and use session IDs to identify sessions. To control the current session list a special watchdog thread should perform checks for expired non-keep-alive sessions once in a while.

Besides the I/O and rapid contact session processing threads, the RCS 30 should have a callback interface available to be called from an external database (e.g. database 35 if it is embodied in a separate server from the RCS 30) on a special thread using TCP communications on a specific port. The RCS 30 may also have support for performance counters, reporting, querying an external database during start-up, logging, etc.

Referring to FIG. 2, an example of a small packet 20 sent from a device 12 to the RCS 30 is shown. The small packet 20 has a header portion 63, which may, for example, include an Internet Protocol header, a TCP header and various checksums. Depending on the protocols used for the transmission, the header portion 63 may be 20 bytes long. Following the header portion 63 there is a data portion that is formed of an HTTP request 64, such as a POST request, and an identification portion 65, which may contain the ESN 16 of a device 12. Depending on the specific case, the HTTP request 64 may be 156 bytes long, for example, and the identification portion 65 may be 24 bytes long. Overall, the packet 20 may therefore be 200 bytes long. Depending on the configuration selected, the small packet in other embodiments may have different portion lengths and a different overall length. The main requirement is that the packet 20 is a small packet, particularly when compared to communication packets 51 with the main server 52, and contains minimal information, typically just enough to identify the device 12 that is calling.

The identification portion 65 may be a public token that is generated based on an ESN for the device 12 and stored at the RCS 30. The RCS 30 stores the key to validate the token and translate it into an ESN.

For example, the data portion (i.e. HTTP request 64 and identification portion 65) in small packet 20 may be as follows:

POST/HTTP/1.1 . . . User-Agent: Moxilla/5.0 (compatible; MSIE 8.0;) . . .
Host: a.fc.namequery.com . . . Content-Length: 24 . . . Connection: Keep-Alive . . . Pragma:
no-cache . . . ¹.Δ.Λ© . . . ˆEsè¾dO¼ . . . μGuö . . .

Referring to FIG. 3, an example of a regular packet 51 sent from a device 12 to the main server 52, or vice versa, is shown. The regular packet 51 has a header portion 67, which may, for example, include an Internet Protocol header, a TCP header and various checksums. Depending on the protocols used for the transmission, the header portion 67 may be 20 bytes long. Following the header portion 67 there is a data portion 68 that may contain detailed identification of components in the device 12, location of the device, files stored on the device, statuses of the device, details of software installed on the device, etc., as well as the ESN 16 of the device. Depending on the specific case, the data portion 68 of the packet 51 may be up to about 1500 bytes long, for example. The main point is that the packets 51 may be, and generally are, large, particularly when compared to communication packets 20 to the RCS 30, and may contain extensive information and commands.

Referring to FIG. 4, a functional flow diagram is shown schematically representing the process that may be undertaken by the system 10 to set up the rapid calling facility for a device 12, for cases where the device is not already set up for making the rapid calls to the RCS 30, but is set up for making calls to the main server 52. The action item of setting up the device 12 for rapid contact is flagged beforehand in database 55 in the main server 52. In step 70, a regular call to the main server 52 is made by the device 12. In step 72, the device 12 receives a command from the main server to start calling the RCS 30, whose URL is also provided to the device, as well as any necessary upgrade code for the agent 14. The rapid calling rate may also be provided to the device 12, in the form of a time interval that should elapse between consecutive rapid calls. The agent 14 in the device 12 then, in step 74, enables the device to make rapid calls to the RCS 30. For example, this may be implemented by setting a bit flag in the agent to indicate that it should make the rapid calls. In step 76, the device 12 makes a rapid call to the RCS 30. In step 78, the RCS 30 determines whether a rapid contact session should be opened with the device 12. If a rapid contact session should not be opened, for example if there is no immediate need for a regular call to be made, then, in step 80, the agent 14 in the device 12 determines whether it is time for a scheduled regular call to the main server 52. If it is not time for such a scheduled regular call, then the process reverts to step 76, in which a subsequent rapid call is made to the RCS 30 after the set time interval for rapid calling has passed. If it is time for a scheduled regular call, then a regular call is made in step 82 to the main server. Returning to step 78, if a rapid contact session is to be opened with the RCS 30, then, in step 84, the RCS requests that the device 12 open a session. If, during the rapid contact session, in step 86, an immediate regular call is not to be made, then the process reverts to step 80, in which the agent determines whether a scheduled regular call is to be made anyway. However, if in step 86, during the rapid contact session, the device 12 is to call the main server 52, then the process moves to step 82, in which the device makes an immediate call to the main server.

Conversely, an owner or administrator of the device 12 may inform the main server 52 that the rapid contact feature is to be disabled. This information would then be transferred from the main server 52 to the RCS 30, which, during the following rapid call from the device 12, would then request the setting up of a rapid contact session in which a command would be sent to the device to stop calling the RCS.

When a device 12 is reported stolen, upon its calling the main server 52 it is commanded to call into the main server more frequently, perhaps every 15 minutes or at some other suitable interval. Since the device 12 will be calling into the main server more often, it will not need to call the RCS 30, and so the agent 14 may be instructed to stop calling the RCS.

Referring to FIG. 5, a flowchart is shown of a process that occurs at the RCS 30 on receiving a rapid call. In step 90, the RCS 30 receives a rapid call and then, in step 92, determines, based upon the ESN received in the rapid call, whether there are any updates for the device 12 with the corresponding ESN. An update may be a new RCS to call, a new main server to call, a new call time or interval, etc. If there be no update required, then in step 94 the RCS 30 ignores the rapid call and does not respond, and the process ends at step 96. If, however, there is an update for the device, then, in step 98, the RCS 30 requests that the device open a session, during which, in step 99, the RCS sends the update(s) to the device. After the update has been sent, the process ends at step 96. This whole process is repeated with each subsequent rapid call.

C. Authorization Token

The agent 14 may communicate with the RCS 30 in two modes: the first is an authenticated mode when the agent has, or has access to, a public RCS authentication token 17, which has been created by the RCS 30 and sent back to device 12; and the second is a unauthenticated mode, either for when the agent does not have such a token 17 or for when changes are being made. If the agent 14 has, or has access to, a token 17, it can be stored in a registry to be persistently restored during reboots. In the authenticated mode, data may be sent unencrypted, since the token 17 will already be an encrypted representation of the agent's identity, and hence device identity, which will be known only to the RCS 30.

If the agent 14 does not have, nor has access to, a token 17 then the agent 14 sends a packet that has no data, and receives in response from the RCS 30 an open session command. The same response will be given if the RCS cannot authenticate the token or the token has been authenticated but there are some changes required and the agent's behavior and/or policy should be updated by changing data in the agent's settings. After receiving the open session command the agent 14 and the RCS 30 establish an encryption key and initialization vector and use them to secure the communication. During the encrypted session, the device's ESN 16 can be retrieved from the database 35 by the RCS 30 and checked for pending actions, and if there are any, then the necessary changes can be made as required, e.g. to the URL of the main server to call, the next regular call time, the URL of the RCS to call, the default callback time to the RCS, etc. A secure token 17 can also be issued. These changes may be changes from null or default values if this encrypted session is for the initial setting up of the agent 14 to call the RCS 30. When a new token has been issued the agent stores it in registry to use in subsequent rapid calls.

To generate the token 17 the RCS 30 obtains the device's ESN as a message and an RCS specific authentication tag (e.g. computer name, data from the registry, a working folder name, etc.) and encrypts the ESN using an RCS encryption key, generated by the RCS based on a specific schedule, such as once per month, and stored in the RCS registry. The token (i.e. encrypted ESN) is then sent to the device 12 as data to be sent back to the RCS in subsequent rapid calls. When the RCS 30 receives the data in a subsequent rapid call, it decrypts it using the authentication tag to reveal the ESN of the device 12. Whenever the authentication tag of the RCS is changed, it will be expected that rapid calls from all devices 12 will result in the establishment of rapid contact sessions until all the tokens 17 have been renewed.

Figure 6:
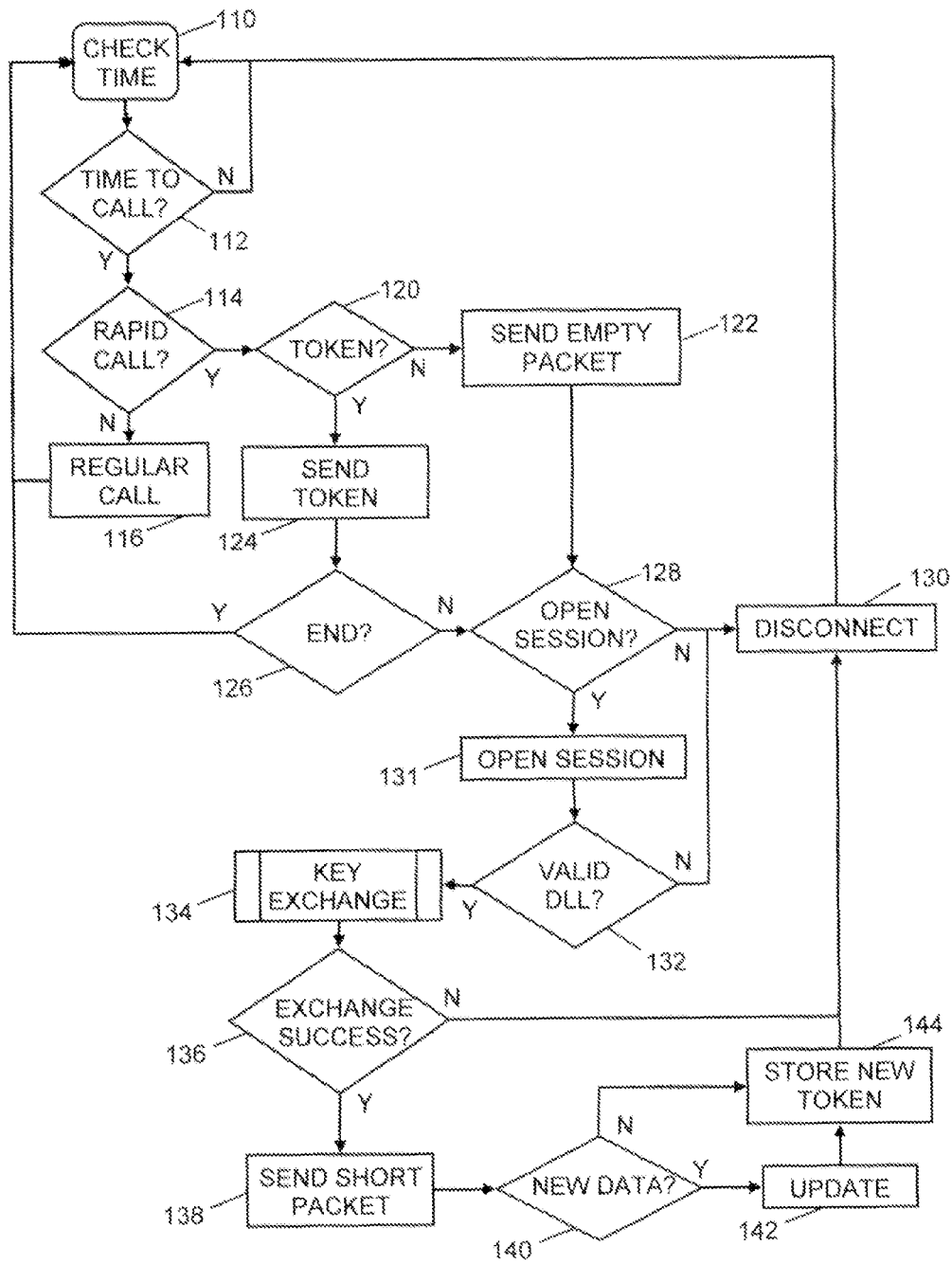
FIG. 6 is a flowchart for transmitting an authentication token from a rapid contact server to a device.

Referring to FIG. 6, a flowchart of the rapid contact system 10 is shown, for the process of setting up a token 17 for the first time, or for changing an existing token. In step 110, the agent 14 checks whether it is time to make a call to either the RCS 30 or the main server 52. If it not be time to make a call, as determined in step 112, the process reverts to step 110 to check at a later time whether it is time to make a call to either of the servers.

If, in step 112, it is time to make a call, the agent determines in step 114 whether it be a rapid call that should be made. If it not be a rapid call, then a regular call is made, to the main server, in step 116. If, in step 114, a rapid call should be made, then the agent determines in step 120 whether it has access to a token 17. If the agent 14 does not have access to a token 17, it sends an empty packet (i.e. with no data, no ESN, or a null ESN) to the RCS 30 in step 122. If, however, the agent 14 has access to a token 17, then it sends a packet 20 containing the token to the RCS in step 124. After the token 17 has been sent, the agent 14 determines whether the communication is ended, in step 126. The end of the communication may be signified by the RCS 30 to the agent 14 by sending it an acknowledgment response, a disconnect command or no response. If, in step 126, it not be the end of the communication, then the agent 14 determines, in step 128, whether it has received an "open session" command from the RCS 30. If it has not received an open session command, the agent 14 disconnects from the RCS 30, in step 130. If, in step 128, the agent 14 receives an open session command from the RCS 30, it opens a session, in step 131. The agent may also arrive at step 128 after step 122, in which it sends an empty packet to the RCS. In step 132, the agent determines whether a valid encryption DLL is present in the device, and if so, keys are exchanged between the agent and the RCS, in step 134. If the key exchange is not successful, as determined in step 136, the agent disconnects from the RCS 30 in step 130. If the key exchange be successful, as determined in step 136, then the agent sends a packet to the RCS, in step 138. The packet sent includes, if available, the device's ESN, the URL of the main server it calls, the next call time to the main server, the URL of the RCS, and the interval to call the RCS. In response, the RCS 30 sends updated data (optional) and a new token 17 to the device 12. If, in step 140, the agent has received new data, it updates the device settings, in step 142. After this, or if there was no new data received by the agent in step 140, the agent 14 stores the new authentication token 17 in the device 12, in step 144. Following this, the agent disconnects, in step 130.

Note that normally the encryption DLL and public RSA keys will be present in the device during a rapid contact session with the RCS 30. If either of these is not present, or the encryption DLL cannot be loaded, then the agent may be configured to automatically call the main server 52 immediately. Alternately, it may act as usual and call the main server as scheduled.

D. Sequence Diagrams

Figure 7:
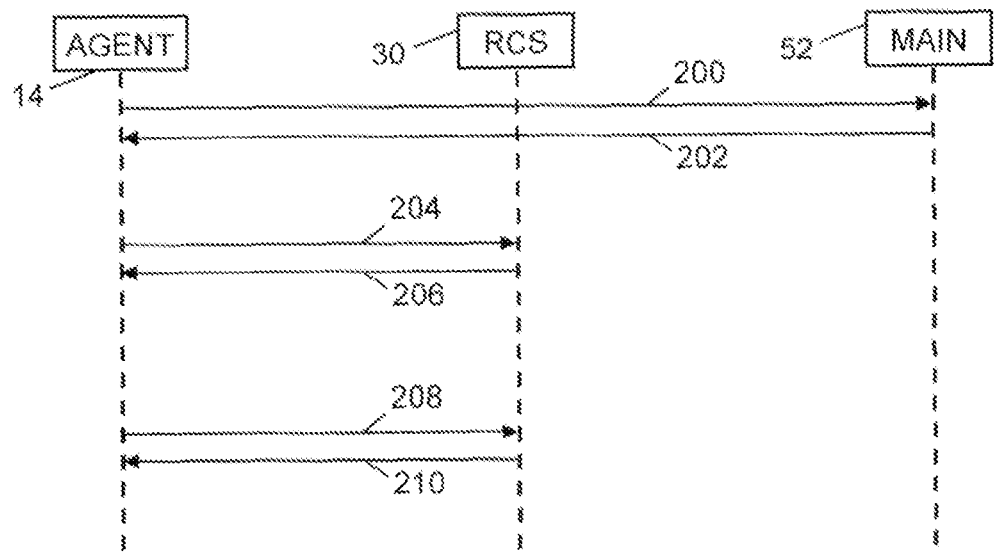
FIG. 7 is a sequence diagram for enabling rapid calling on a device.

Referring to FIG. 7, a sequence diagram is shown for enabling rapid calling on a device that is already enabled for regular calling to the main server (e.g., guardian server). As a result of a regular agent call 200 from the agent to the main server, the rapid calling (FC, or fast calling) feature is set up 202 during a communication session that is established between the device and the main server. Following the set-up of the rapid calling feature, the agent then makes a rapid call 204 to the RCS 30. The RCS responds with an acknowledgment 206 as there is nothing to do. A short while later, the agent makes a further rapid call 208, and again receives an acknowledgment 210 as there is still nothing to be done.

Figure 8:
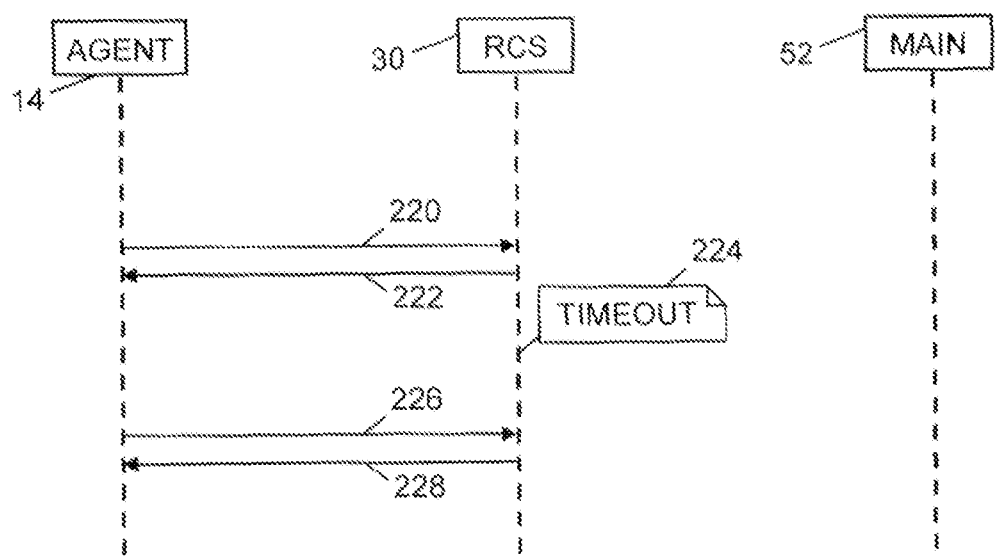
FIG. 8 is a sequence diagram for when there are no pending actions for a device.

Referring to FIG. 8, a sequence diagram is shown for system operations when there are no pending actions for the device. The agent POSTs an HTTP request 220 to the RCS. The RCS responds with an acknowledgment 222 as there is nothing to do. A short while later 224, the agent makes a further rapid call 226, and again receives an acknowledgment 228 as there is still nothing to be done.

Figure 9:
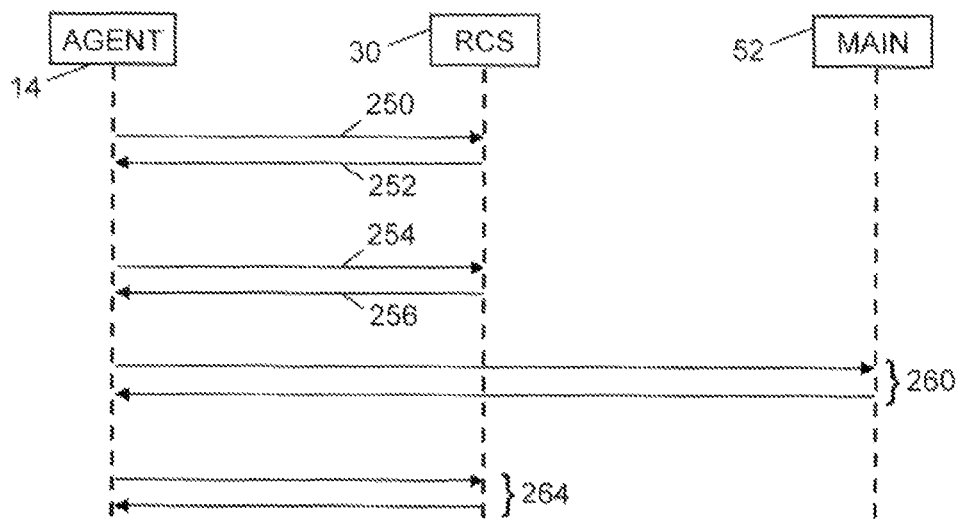
FIG. 9 is a sequence diagram showing rapid and regular calls.

Referring to FIG. 9, a sequence diagram is shown showing the events that occur when a regular call is made by an agent that is also configured for rapid calling. The agent POSTs an HTTP request 250 to the RCS. The RCS responds with an acknowledgment 252 as there is nothing to do. A short while later, the agent makes a further rapid call 254, and again receives an acknowledgment 256 as there is still nothing to be done. Next, at the scheduled regular call time, it becomes time for a regular call 260 to the main server, involving the setting up of a session and exchange of data associated with the regular call. After the regular call, the agent reverts to making rapid calls 264 to the RCS.

Figure 10:
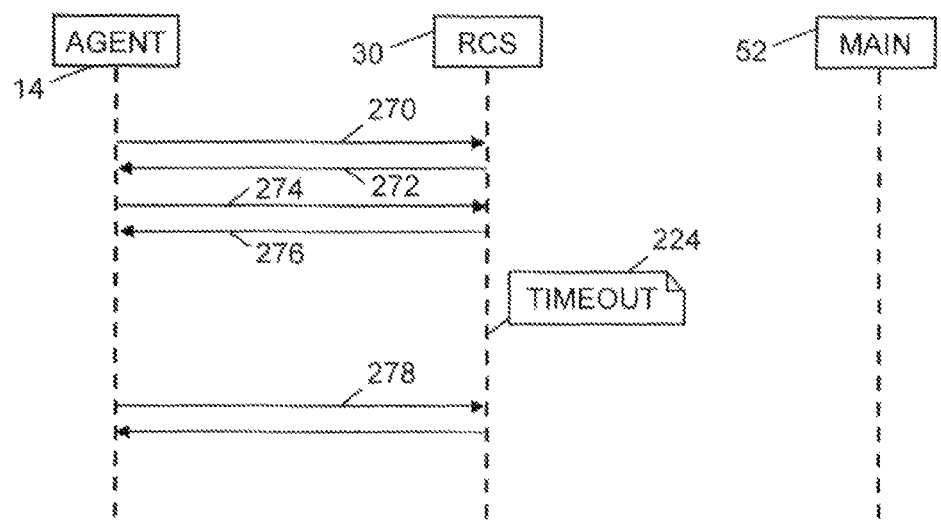
FIG. 10 is a sequence diagram for updating a rapid calling setting.

Referring to FIG. 10, a sequence diagram is shown showing how the rapid calling setting may be updated during a call to the RCS. First, the agent sends an HTTP packet 270 to the RCS. The RCS responds with a request 272 to open a session. The agent then sends its current settings to the RCS 274, following which the RCS sends updated settings 276 back to the agent. The session then terminates. Assuming that the RCS did not send a setting to switch off the rapid calling, the agent calls the RCS again 278, after the usual timeout interval has passed.

Figure 11:
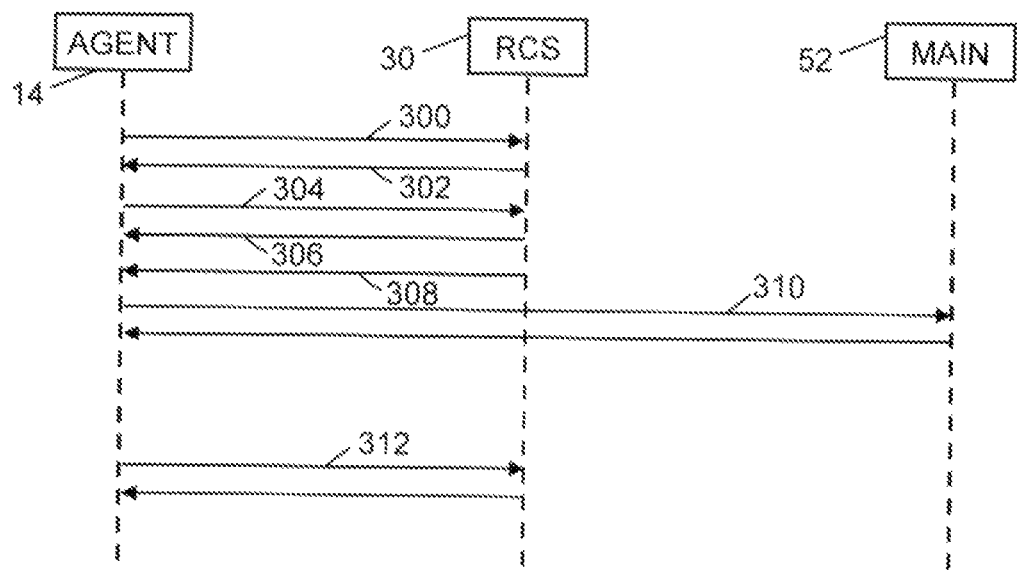
FIG. 11 is a sequence diagram for forcing an agent call to a main server.

Referring to FIG. 11, a sequence diagram is shown showing how an agent call to the main server can be forced. This is achieved using only five packets, for example. First, the agent sends an HTTP packet 300 to the RCS, then the RCS sends a request 302 to the agent to open a session. The agent then sends its settings 304 to the RCS, which then sends back updated settings 306, if any, and then sends back a command 308 for the agent to call the main server immediately. After the rapid contact session with the RCS is disconnected, the agent immediately calls 310 the main server, out of its normal schedule, and establishes a session with it. When the session with the main server has terminated, the agent, after the rapid call interval has lapsed, then calls 312 the RCS as usual.

Figure 12:
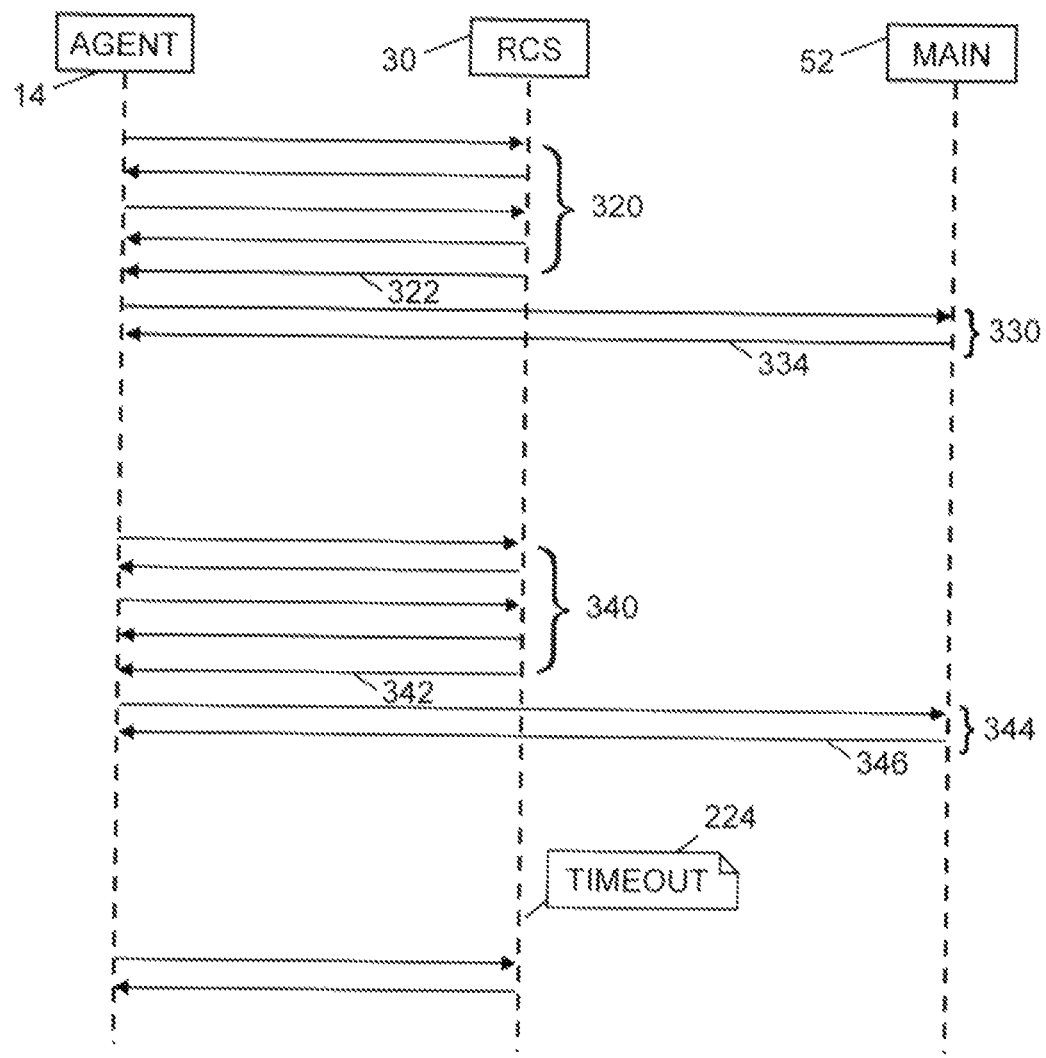
FIG. 12 is a sequence diagram for invoking security actions.

Referring to FIG. 12, a sequence diagram is shown showing the performance of security actions. As described above, a rapid call 320 is made to the RCS during which a command is sent 322 to the agent to initiate an immediate call to the main server. This is because a flag has been set at the RCS for the particular agent to force a call to the main server. During the session 330 with the main server, the agent receives an instruction 334 to start deleting data from the device. The session with the main server ends and the device continues with the data delete operation. The time interval between rapid calls elapses after the data delete operation has finished. Since there is another high priority action to be taken by the agent, then during the subsequent rapid call 340 to the RCS, a command 342 to call the main server is once again transmitted from the RCS to the agent. In this example, a command 346 to freeze the device is sent during the call 344 to the main server. Even though the device is frozen, it still retains the capability of calling the RCS, which it does so after the inter-call interval 224 has elapsed. This time, as there are no outstanding actions for the agent, and the flag at the RCS has been reset, then a session with the main server is not requested.

E. Further Embodiment, with Consolidation Server

Figure 13:
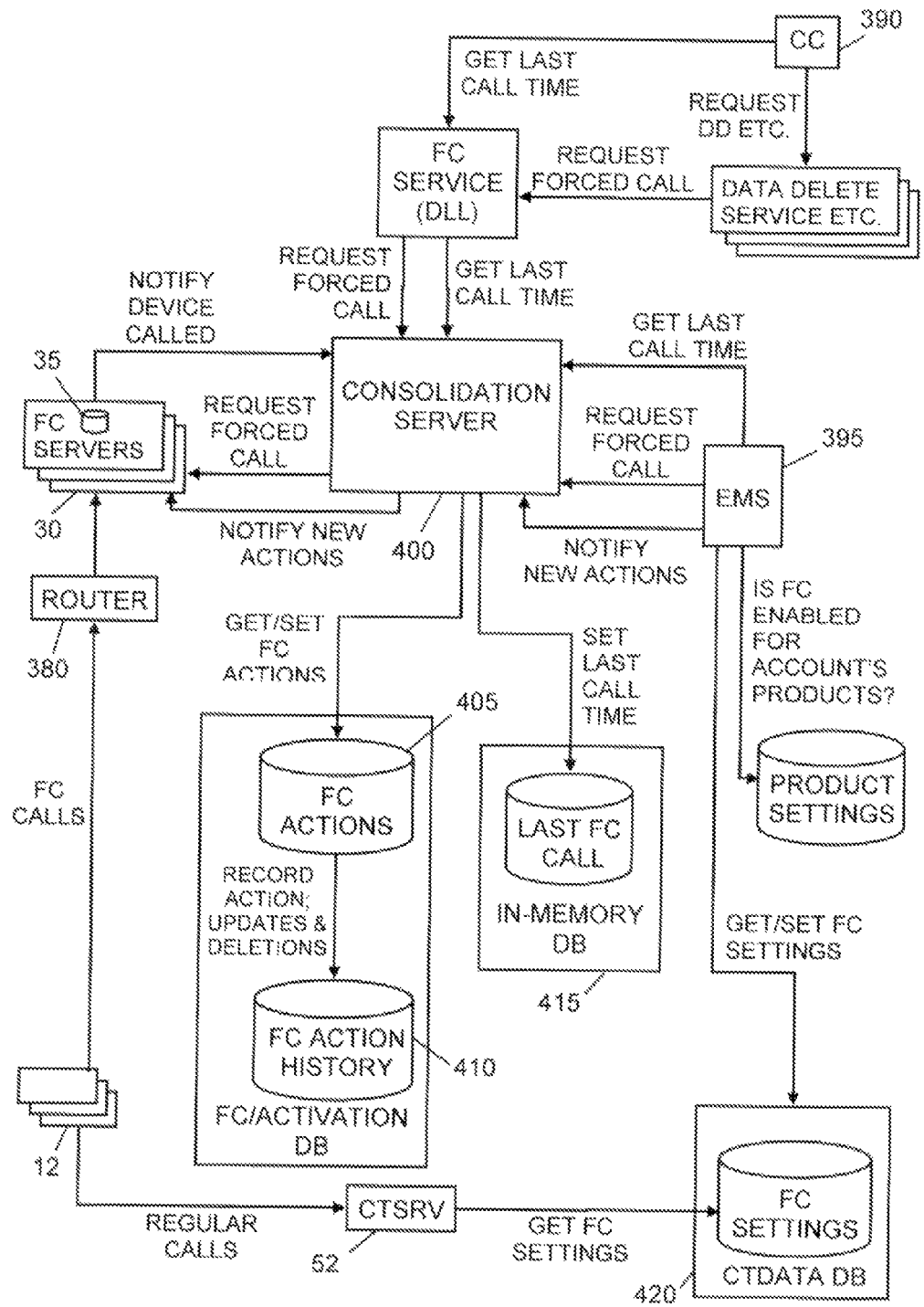
FIG. 13 is a basic block diagram of an alternate embodiment of a rapid contact system, with a consolidation service.

Referring to FIG. 13, a further embodiment of the rapid contact system is shown. It shows multiple devices 12 connected via a router 380 to multiple RCSs (FC servers) 30. The main server 52 is shown as CTSrv. A customer center server (CC) 390 is shown, which implements a web application that allows customers to view rapid contact related information, and to enable and disable the rapid calling feature. It may show which devices have rapid contact enabled, and which do not. It can show the time of the last rapid call from each device, and can highlight the ones that have called in recently, as these are more likely to be online. The CC may be used to force a regular call to the main server. The CC may show which devices have outstanding parameter update or force agent call actions against them, and a history of the actions that have already been completed. If the user requests an End User Message, Device Freeze or Data Delete on a device with rapid contact enabled, then the CC will notify the consolidation service 400 (see below) that the device should make a regular agent call the next time it calls in.

The EMS 395 is an ESN Management Server, which is also implemented as a web service, with some functions similar to those of the CC 390. This will allow users to set rapid contact related parameters on one or a group of computers at the same time. The computers may be on a common order or in a common account. It may be used to request a forced call to the main server. The EMS 395 may show which devices have rapid contact enabled, and which do not. It can show the time of the last rapid call from each device, and can highlight the ones that have called in recently, which are more likely to be online. The EMS may show which devices have outstanding parameter update or force agent call actions against them, and a history of any actions that have already been performed on them.

The RCS obtains information from the consolidation service 400 about whether a particular agent needs to make a regular call to the main server. When a device calls in, the RCS sends the device this information and then notifies the consolidation service about the call and any changes that were made.

The consolidation service 400 notifies the RCS about any new requests to update an agent's parameters. When an RCS notifies the consolidation service about a completed agent parameter change, the consolidation service writes information about the change to the external database 410. The consolidation service also provides information to both CC and EMS, such as status information about the RCSs that are connected to it and the last time a particular device called in to an RCS. For small rapid contact systems, the consolidation service may be implemented merely as an interface and/or API, but for larger systems it is better implemented as a standalone server.

The rapid contact database 405 stores a list of parameter updates for the devices that need to be updated on their next call. When the RCSs start up they query the rapid contact database 405 directly to seed their local cache 35. The CC and EMS query the database 410 directly to get information about which actions have been completed. The database 415 also maintains a volatile history of when each device last called in to it so that the EMS and CC can show which devices are likely to be currently on-line.

F. Processes of the Further Embodiment

Figure 14:
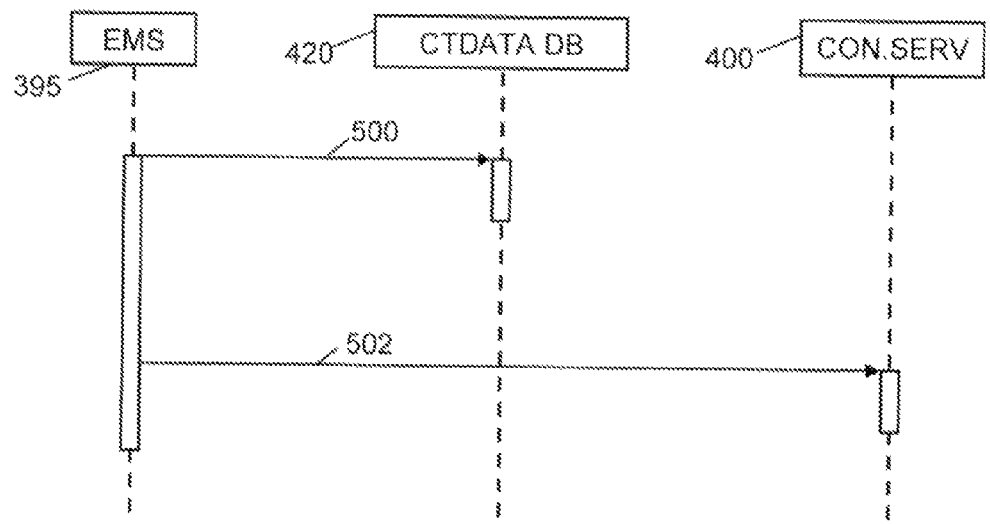
FIG. 14 is a sequence diagram for device configuration.

Referring to FIG. 14, a sequence diagram is shown for device configuration. The EMS 395 is used to set 500 the rapid contact parameters for the device, and sends the required parameters to the CTData database 420 (FIG. 13). It also sends 502 the parameters to the consolidation service 400.

Figure 15:
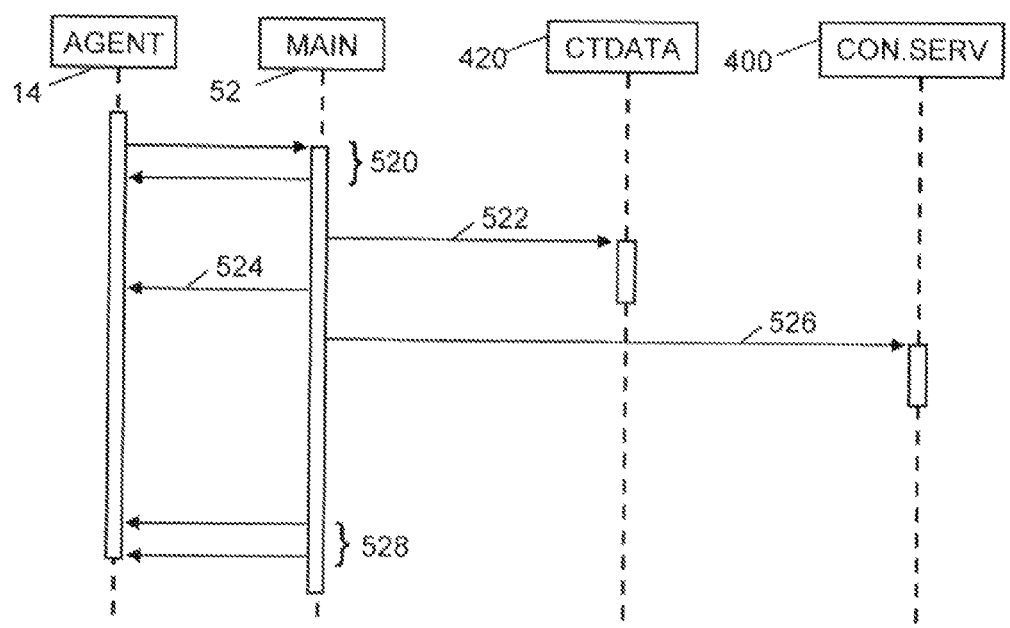
FIG. 15 is a sequence diagram for a device parameter update.

In FIG. 15, a sequence diagram is shown for device parameter update. The agent makes a regular call to the main server, during which the usual messages are exchanged. Also during the call, the main server retrieves 522 the rapid contact parameters for the device from the CTData database. The rapid contact parameters are set 524 on the device, and after these are set, notification of the completed action is sent 526 by the main server 52 to the consolidation service 400 via the EMS 395. Following this there may be more standard messages 528 exchanged between the device and the main server.

Figure 16:
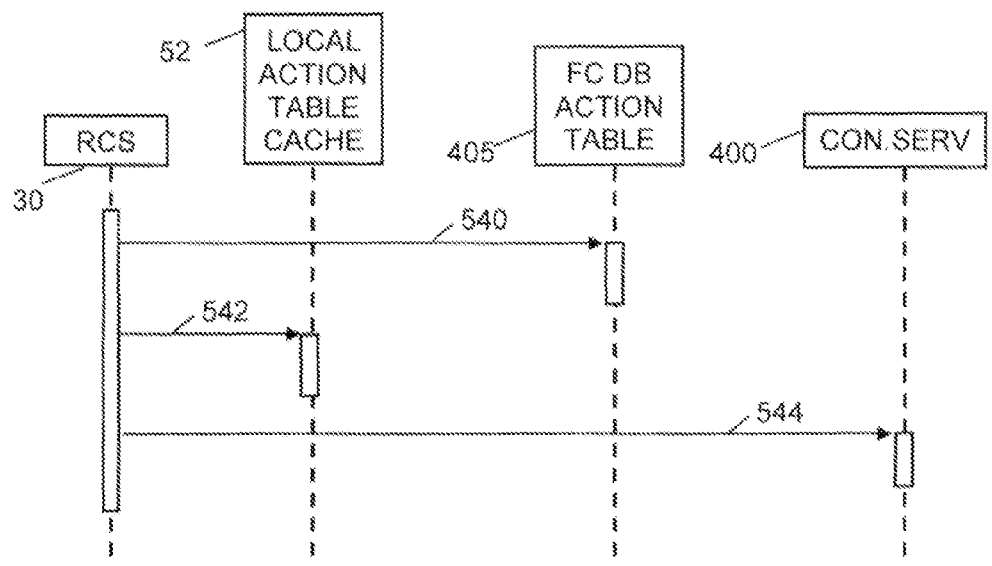
FIG. 16 is a sequence diagram for startup of a rapid contact server.

In FIG. 16, a sequence diagram is shown for start up of the RCS. To start with, the RCS gets 540 any pending actions from the rapid contact database 405. It then writes 542 any pending actions to the local action table cache 35, and registers 544 with the consolidation service 400.

Figure 17:
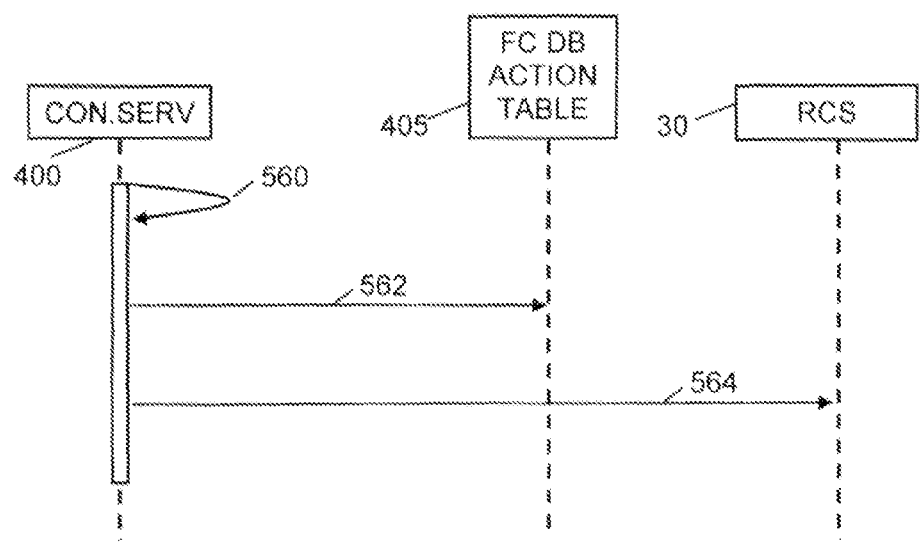
FIG. 17 is a sequence diagram for polling for awaiting device parameter updates or for forced calls.

In FIG. 17, a sequence diagram is shown for the polling for new parameter updates or for forced calls. After expiry of a timer 560, the consolidation service 400 gets new actions 562 from the action table in the database 405, after which it notifies 564 the RCS of new actions.

Figure 18:
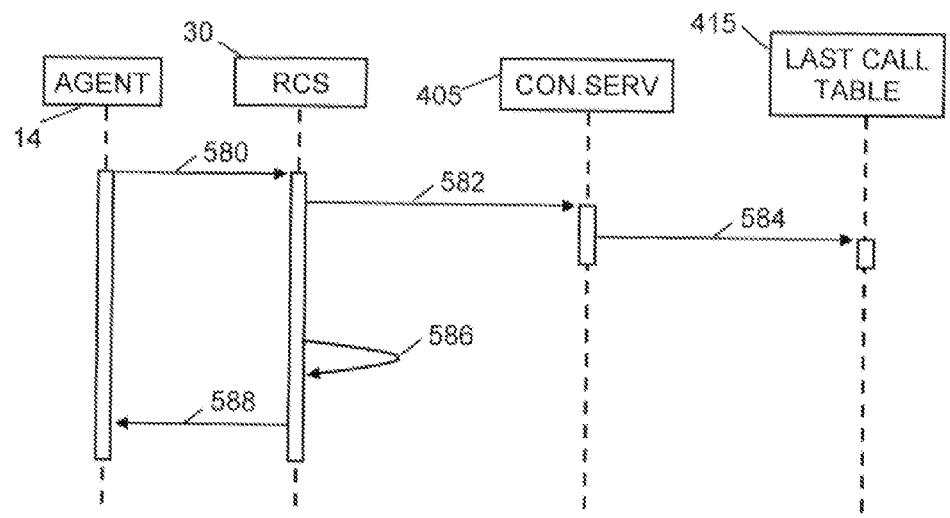
FIG. 18 is a sequence diagram for a rapid call, in the absence of pending parameter updates or a forced call instruction.

In FIG. 18, a sequence diagram is shown for a rapid agent call to the RCS 30, in the absence of pending parameter updates or forced call instructions. First, the agent makes a rapid call 580 to the RCS. The RCS sends 582 the last call time for the device to the consolidation service, which then sends 584 the last call time to the last call table in the in-memory database 415. The RCS then looks 586 in the local database cache 35 for any actions that may be pending for the device 12. As there are none, the RCS simply sends an acknowledgement back to the device.

Figure 19:
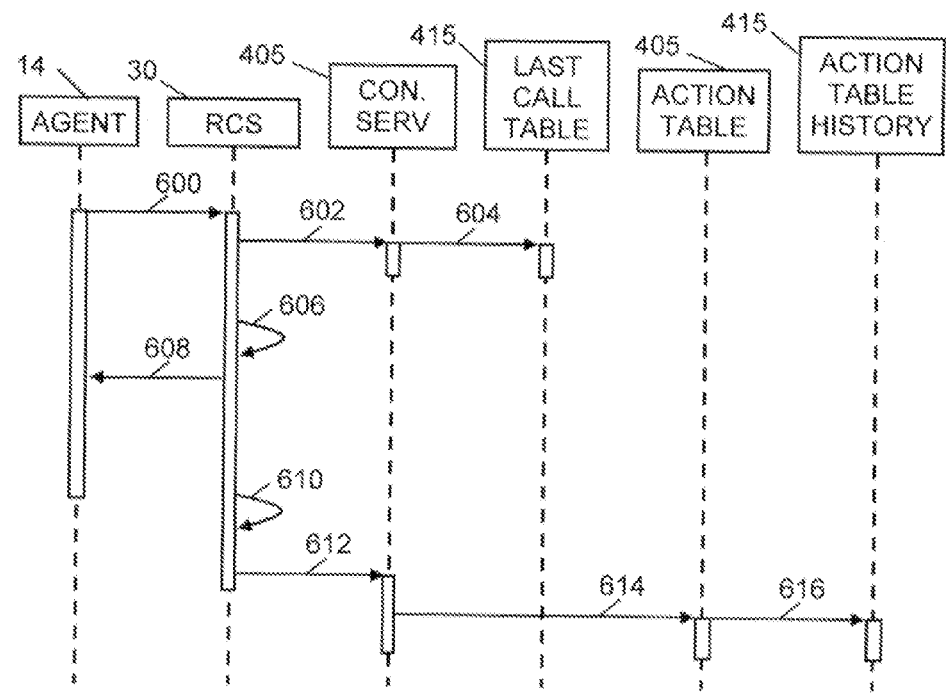
FIG. 19 is a sequence diagram for a rapid call when there is a pending parameter update or forced call.

In FIG. 19, a sequence diagram is shown for a rapid call to the RCS 30 when there is a pending parameter update or forced call. First, the agent calls 600 the RCS, which sends 602 the last call time to the consolidation server, which in turn sends 604 the last call time to the last call table in the database. The RCS gets 606 any pending actions for the device, which in this case are new parameters to be set. The new parameters are sent 608 to the agent, and then, the action having been completed, is deleted 610 from the list of actions awaiting the device. The action having been completed is then set as completed 612 at the consolidation server, which then sets the action as completed 614 in the action table and makes an entry 616 in the action table history.

G. Scaling

Figure 20:
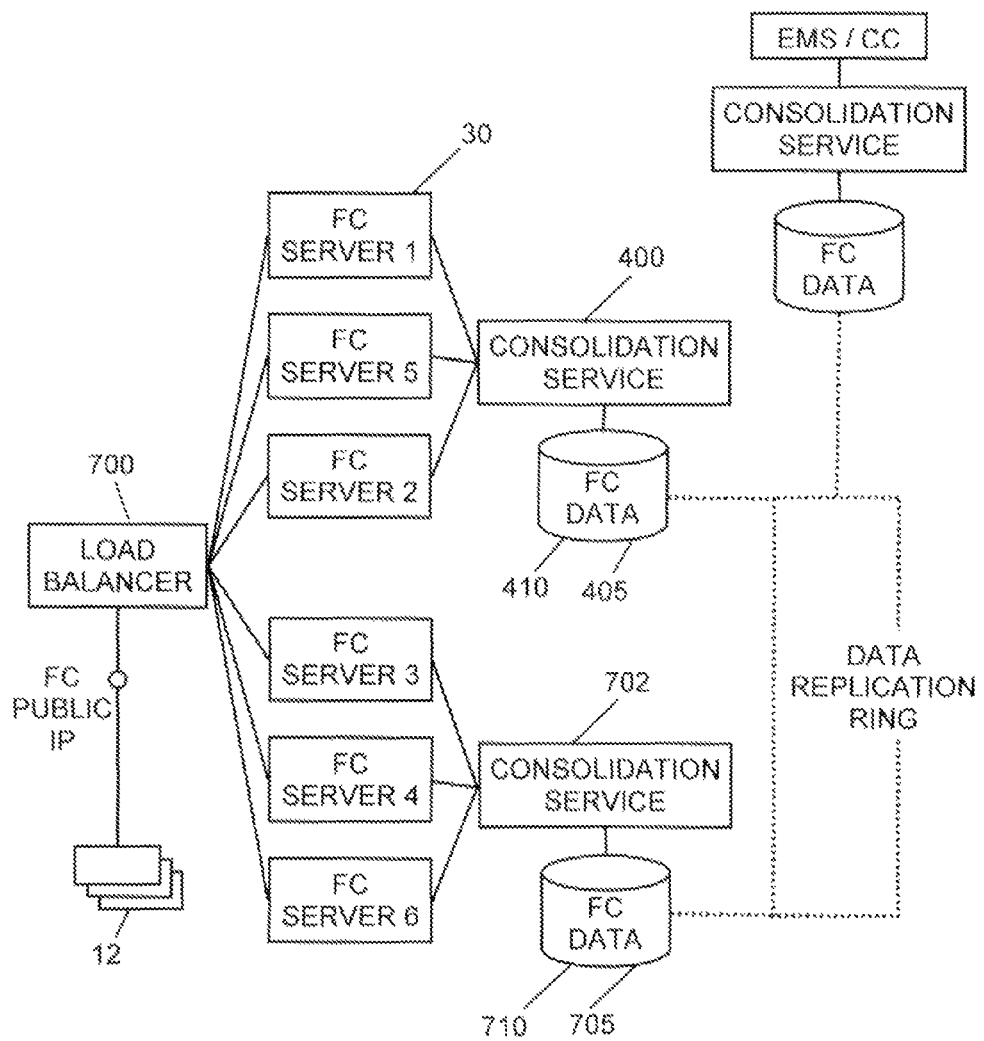
FIG. 20 is a basic block diagram of an alternate embodiment of a rapid contact system, with multiple consolidation servers.

The rapid contact system 10 may include multiple RCSs connected to the network 18 via a load balancer 700, as shown in FIG. 20. If the maximum capacity of the consolidation server 400 is reached then one or more further consolidation servers 702 can be added, each being responsible for a given set of RCSs 30 and each having a corresponding database 705, 710 configured to store data and actions for the devices 12 that are configured to call them. For each additional consolidation server, or group of consolidation servers, there may be another load balancer added, with its own public IP address for the corresponding devices 12 to call. A high performance distributed data store such as Apache Cassandra∩, Microsoft Velocity™ or Microsoft Server AppFabric™ may be used, so that all consolidation servers can work against essentially the same data.

H. Industrial Applicability

The rapid contact system can reduce the time taken for an administrator or owner of a device to invoke a security measure on a remote device, such as data delete, device freeze, etc. Furthermore, the availability of a communication channel between a protected device and a monitoring server is intermittently, but frequently, maintained without incurring the costs and using the resources and bandwidth that would be required to maintain a continuous connection.

I. Variations

Different call intervals to the RCS 30 may be used. For example, if an RCS can handle 100,000 calls per minute, then a system wide call interval of 30 minutes will allow 3 million devices to be managed. Alternately, if the call interval is set to 5 minutes, then 500,000 devices can be managed.

When requested to read fields or flags, the agent 14 may be configured to just read the relevant ones, rather than a set of fields or flags, some of which may not be required.

Devices may be configured to make rapid calls at different time intervals depending on whether they are connected to their home network or not. As devices are generally considered to be safer on their home network, then a longer rapid calling interval, such as one hour may be acceptable. When the device leaves the office or the home, then it is considered to be less safe, and the rapid calling interval may be reduced to 5 minutes, for example. This feature may be implemented either within the agent or within the RCS.

A backup RCS may be employed in case the primary RCS fails or suffers problems in its operation.

In some embodiments, the basic principles behind the disclosed architecture can be practiced without the use of a Rapid Contact Server in a technical sense. Thus, for example, in some embodiments, the monitoring center may include a first server and a second server that each communicate with the electronic devices using different respective protocols, such that the second server (which may, but need not, be a Rapid Contact Server) is better suited for handing relatively short, frequent communications with the electronic devices. The second server may instruct an electronic device (using the second protocol) to contact the first server when, for example, the electronic device is reported as stolen; the electronic device may then contact the first server (using the first protocol) and retrieve one or more security instructions as described above.

Where feasible, functions of the rapid contact system described as being performed by one server may be divided between separate servers, and functions described as being performed on multiple servers may be combined on the same server. Intermediate servers may also be employed in the system. Databases may also be arranged in a different architecture to that shown herein.

The device 12 may call in to one or both of the servers on a random, or semi-random basis, or on a gradually varying time period.

If the rapid contact system 10 is configured for sending acknowledgments to devices 12 when a rapid call is received, when no action is to be taken, then the agent 14 may be configured to call the main server 52 immediately after making a predetermined number of consecutive rapid calls that are not acknowledged.

The rapid contact system 10 may be configured such that the agent only makes the calls to the main server if commanded to do so by the RCS. If there are no outstanding actions for the device, then it will not need to call the main server.

Rapid calls to the RCS 30 are different to heartbeats because the absence of a rapid call does not necessarily signify a problem in the same way that absence of a heartbeat would, and no information as to the status of the device 12 is conveyed in the rapid call, as is often done with a heartbeat. The rapid calls are also different to pings, because a response from the RCS 30 is not necessary, whereas a ping requires a response. A rapid call is more of a 'poke,' which signifies making contact at a distance without necessarily requiring a response.

The agent may be configured to contact the RCS at different rates depending on whether the connection is likely to be metered or not. For example, if it is made over mobile broadband or not.

Steps in the flowcharts may be performed in a different order to that illustrated, or they may be combined where shown separately. Steps may be omitted and others added, and steps from different flowcharts may be interchanged, all without departing from the scope of the invention. Tasks described herein as being performed by the "agent" may be performed by the associated device under the control of the agent, such as through execution of program code of the agent.

Different quantities, relative quantities, sizes, time intervals, packet lengths, numbers of packets, serial number formats and other straightforward changes are also contemplated.

The present description is of the best presently contemplated mode of carrying out the subject matter disclosed and claimed herein. The description is made for the purpose of illustrating the general principles of the subject matter and not be taken in a limiting sense; the subject matter can find utility in a variety of implementations without departing from the scope of the disclosure made, as will be apparent to those of skill in the art from an understanding of the principles that underlie the subject matter.

The invention claimed is:

1. A monitoring system for monitoring electronic devices, the system comprising:
   a first server that is configured to communicate via the Internet with the electronic devices according to a first protocol, said first server configured to transmit security instructions to electronic devices that are reported as lost or stolen, including security instructions that protect data stored on the electronic devices; and
   a second server that is configured to communicate via the Internet with the electronic devices according to a second protocol at a greater frequency than said first server communicates with the electronic devices, said second server configured to instruct an electronic device that is reported as lost or stolen to contact the first server, such that the electronic device can retrieve a security instruction from the first server,
   wherein the second protocol is optimized for communications conducted using packets having a smaller byte size than packets carrying communications according to the first protocol.

2. The system of claim 1, wherein the second server enables the electronic devices to communicate with the monitoring system more frequently than would be possible if the electronic devices communicated with the monitoring system solely with the first server.

3. The system of claim 1, wherein the second protocol enables the electronic devices to communicate with the monitoring system more frequently than would be possible if the electronic devices communicated with the monitoring system solely with the first protocol.

4. The system of claim 1, wherein the second server uses a software thread architecture that, in comparison to a software thread architecture of the first server, is optimized for handling a larger number of shorter communications with the electronic devices.

5. The system of claim 4, wherein the second server uses a pool of non-session-specific threads to communicate with the electronic devices, and the first server communicates with the electronic devices using threads that are dedicated to specific communication sessions with the electronic devices.

6. The system of claim 1, wherein the second server communicates with at least 500,000 electronic devices.

7. The system of claim 1, wherein each communication using the second protocol consists of a single packet sent from one electronic device of the plurality of electronic devices to the second server.

8. The system of claim 7, wherein the packet includes an identification of said one electronic device.

9. The system of claim 8, wherein the identification is encrypted.

10. The system of claim 8, wherein in response to receiving the packet the second server determines, based on the identification and a flag associated with the identification, whether it should establish a session with said one electronic device.

11. The system of claim 10, wherein if the second server determines that it should not establish the session, the second server does not respond to said one electronic device.

12. The system of claim 10, wherein if the second server determines that it should not establish the session, the second server sends an acknowledgment to said one electronic device.

13. The system of claim 10, wherein if the second server determines that it should not establish the session, the second server sends a disconnect instruction to said one electronic device.

14. The system of claim 10, wherein if the second server determines that it should not establish the session, the second server disconnects from said one electronic device.

15. The system of claim 10, wherein if the second server determines that it should establish the session, the second server sends a message to said one electronic device requesting it to open the session.

16. The system of claim 8, wherein the packet includes no information relating to said one device other than said identification.

17. The system of claim 7, wherein the packet is less than $2\times10^2$ bytes long.

18. The system of claim 1, wherein a further communication using the second protocol occurs from the second server to one of the electronic devices via a short session having up to five packets.

19. The system of claim 18, wherein the short session has up to four packets.

20. The system of claim 18, wherein a communication using the first protocol occurs from the first server to said one device via a long session that is at least an order of magnitude bigger than the short session in terms of numbers of bytes communicated.

21. The system of claim 20, wherein the communication using the first protocol occurs via a long session that is 1-4 orders of magnitude bigger than the short session in terms of numbers of bytes communicated.

22. The system of claim 1, wherein a communication using the first protocol comprises the first server instructing an electronic device to stop communicating with the second server.

23. The system of claim 1, further comprising an agent that is configured to be installed on the electronic devices to enable the electronic devices to communicate with the first and second servers using the first and second protocols respectively, said agent configured to place calls to the first server at a first rate, and to place calls to the second server at a second rate that is higher than the first rate.

24. A non-transitory computer readable medium that stores an executable agent, said executable agent comprising instructions that direct an electronic device to perform a process that comprises:
   communicating with a first server of a monitoring system according to a first protocol via the Internet, and with a second server of the monitoring system according to a second protocol via the Internet, wherein the second protocol is optimized for communications conducted using packets having a smaller byte size than packets carrying communications according to the first protocol;
   receiving, from the second server, in a session based on the second protocol, an instruction to contact the first server;
   in response to the instruction, initiating a communication session with the first server according to the first protocol, wherein the electronic device receives a security instruction from the first server during the communication session, said security instruction specifying a security action associated with a theft or loss of the electronic device; and executing the security instruction.

25. The non-transitory computer readable medium of claim 24, wherein the agent instructs the electronic device to call the first server at a first recurring call rate, and to call the second server at a second recurring call rate that is greater than the first recurring call rate.

26. The non-transitory computer readable medium of claim 24, wherein the second protocol is optimized for communications that are 1-4 orders of magnitude smaller in byte size than communications using the first protocol.

27. A method for monitoring electronic devices comprising the steps of:

receiving in a first server a notification that an electronic device that is reported as lost or stolen has an awaiting security instruction;

receiving in a second server a notification that the electronic device should contact the first server;

receiving via the Internet in the second server a single packet from the electronic device comprising an identification of the electronic device;

confirming in the second server that the identification is flagged for the electronic device to contact the first server;

establishing a first session over the Internet between the second server and the electronic device during which the second server instructs the electronic device to contact the first server; and establishing a second session over the Internet between the first server and the electronic device during which the first server communicates the security instruction to the electronic device, wherein the first session with the second server is conducted (a) using a packet having a smaller byte size than a packet in the second session with the first server and (b) according to a protocol in which the electronic device communicates at a greater frequency than the electronic device communicates with the first server.

28. The method of claim 27, wherein the second session is 1-4 orders of magnitude greater that the first session in terms of numbers of bytes communicated.

29. The method of claim 27, wherein the second server uses a pool of threads to communicate with the electronic device and the first server communicates with the electronic device using threads that are dedicated to specific sessions.

30. The method of claim 27, wherein the first session has up to 5 packets.

31. The method of claim 27, wherein the single packet used in the first session has $2 \times 10^2$ bytes or less.

* * * * *